(12) United States Patent
Liu et al.

(10) Patent No.: US 11,060,298 B2
(45) Date of Patent: Jul. 13, 2021

(54) PANELS AND DECORATIVE PANEL

(71) Applicant: JETCOAT (Shanghai) CO Ltd, China, Shanghai (CN)

(72) Inventors: Huihuang Liu, Taoyuan (TW); Tungyueh Liu, Shanghai (CN); Juntai Huang, Shanghai (CN); Kuojiun Liu, Shanghai (CN)

(73) Assignee: JETCOAT (Shanghai) CO LTD, Shanghai (CN)

( * ) Notice: Subject to any disclaimer, the term of this patent is extended or adjusted under 35 U.S.C. 154(b) by 0 days.

(21) Appl. No.: 16/631,450

(22) PCT Filed: Mar. 16, 2018

(86) PCT No.: PCT/CN2018/079231
§ 371 (c)(1),
(2) Date: Jan. 15, 2020

(87) PCT Pub. No.: WO2019/015346
PCT Pub. Date: Jan. 24, 2019

(65) Prior Publication Data
US 2020/0131783 A1 Apr. 30, 2020

(30) Foreign Application Priority Data
Jul. 19, 2017 (CN) .......................... 201720876137.2

(51) Int. Cl.
*E04F 13/08* (2006.01)
*E04F 13/18* (2006.01)
(Continued)

(52) U.S. Cl.
CPC ...... *E04F 13/0891* (2013.01); *E04F 13/0871* (2013.01); *E04F 13/0894* (2013.01);
(Continued)

(58) Field of Classification Search
CPC .............. E04F 13/0891; E04F 13/0871; E04F 13/0894; E04F 13/18; E04F 15/02005;
(Continued)

(56) References Cited

U.S. PATENT DOCUMENTS 6,006,486 A * 12/1999 Moriau ................... F16B 5/008
52/589.1
6,588,166 B2 * 7/2003 Martensson .......... E04B 1/6129
52/578
(Continued)

FOREIGN PATENT DOCUMENTS

CN      1294238 A  *  5/2001  .......... E04F 13/0801
CN    201106266 Y  *  8/2008
(Continued)

OTHER PUBLICATIONS

International Search Report for PCT/CN2018/079231 and English translation thereof (12 pages). (Year: 2018).*

*Primary Examiner* — Rodney Mintz
(74) *Attorney, Agent, or Firm* — Duane Morris LLP (57) ABSTRACT

Disclosed is a panel comprising a substrate (1), wherein the outer surface of the substrate (1) is covered with a coating layer (8), wherein one edge of the substrate (1) is provided with a recess (3), and a groove (4) is arranged inside the substrate (1) adjacent and interconnected to the recess (4), and wherein the opposite edge of the substrate (1) is provided with a protrusion (7) that can be fitted into the recess (3), and a tongue (6) is extended from the protrusion (7) that can fitted into the groove (4). The substrate is made of 100 parts by mass of PVC resin or PVC powder, 25-45 parts of styrene elastomer, 180-280 parts of stone powder, sawdust or rock, 1-10 parts of an additive, and 1-4 parts of an elastomer coupling agent. Also disclosed is a decorative panel formed by arranging and interlocking the panels in
(Continued)

sequence by fitting the protrusion of a panel into the recess of a neighboring panel, as well as a panel installation process.

19 Claims, 6 Drawing Sheets

(51) Int. Cl.
| | |
|---|---|
| *E04F 15/02* | (2006.01) |
| *E04F 15/10* | (2006.01) |
| *F16B 5/00* | (2006.01) |
| *C08L 25/06* | (2006.01) |
| *C08L 27/06* | (2006.01) |
| *C08L 97/02* | (2006.01) |

(52) U.S. Cl.
CPC ........ *E04F 13/18* (2013.01); *E04F 15/02005* (2013.01); *E04F 15/10* (2013.01); *F16B 5/008* (2013.01); *C08L 25/06* (2013.01); *C08L 27/06* (2013.01); *C08L 97/02* (2013.01); *E04F 13/0887* (2013.01); *E04F 15/02155* (2013.01)

(58) Field of Classification Search
CPC .. E04F 15/10; E04F 13/0887; E04F 15/02155
See application file for complete search history.

(56) References Cited

U.S. PATENT DOCUMENTS

| | | | | |
|---|---|---|---|---|
| 8,544,232 B2 * | 10/2013 | Wybo | ............... | B29C 66/12423 52/588.1 |
| 8,549,807 B2 * | 10/2013 | Meersseman | ............ | B32B 7/12 52/313 |
| 8,726,603 B2 * | 5/2014 | Huang | ............... | E04F 15/02038 52/591.1 |
| 9,080,329 B2 * | 7/2015 | Dohring | ................. | E04F 15/02 |
| 9,528,275 B2 * | 12/2016 | Cappelle | ............... | E04F 15/102 |
| 10,337,191 B2 * | 7/2019 | Cappelle | ........... | E04F 15/02038 |
| 10,844,610 B2 * | 11/2020 | Boucke | ................ | E04F 15/107 |
| 10,895,079 B2 * | 1/2021 | Li | ........................... | E04F 13/18 |
| 2001/0034991 A1 * | 11/2001 | Martensson | .......... | E04B 1/6129 52/578 |
| 2004/0031225 A1 * | 2/2004 | Fowler | ..................... | B32B 3/02 52/578 |
| 2006/0010820 A1 * | 1/2006 | Schwitte | ............. | E04F 13/0826 52/592.1 |
| 2006/0154015 A1 * | 7/2006 | Miller | ................... | E04F 15/085 428/50 |
| 2011/0247285 A1 * | 10/2011 | Wybo | .................... | B29C 48/12 52/309.1 |
| 2011/0280655 A1 * | 11/2011 | Maertens | ................ | E04F 15/02 403/375 |
| 2012/0027967 A1 * | 2/2012 | Maertens | ................ | E04F 13/08 428/34.1 |
| 2012/0317911 A1 * | 12/2012 | Huang | ............. | E04F 15/02038 52/309.1 |
| 2013/0067842 A1 * | 3/2013 | Meersseman | ............. | B44C 1/24 52/309.4 |
| 2013/0192158 A1 * | 8/2013 | Cappelle | ................. | B32B 37/10 52/588.1 |
| 2013/0269279 A1 * | 10/2013 | Fowler | ..................... | B32B 3/02 52/588.1 |
| 2013/0283719 A1 * | 10/2013 | Dohring | ............ | E04F 15/02038 52/582.2 |
| 2016/0289975 A1 * | 10/2016 | Kobayashi | ............. | B05D 3/007 |
| 2017/0292276 A1 * | 10/2017 | Cappelle | ............. | E04F 15/107 |
| 2018/0371765 A1 * | 12/2018 | Adametz | ............. | B32B 27/08 |
| 2020/0131784 A1 * | 4/2020 | Boucke | ............. | E04F 13/0894 |
| 2020/0290306 A1 * | 9/2020 | Liu | ........................... | C08J 7/0427 |
| 2020/0325689 A1 * | 10/2020 | Li | ........................... | B32B 27/36 |
| 2021/0053335 A1 * | 2/2021 | Vermeulen | ............. | E04F 15/02 |

FOREIGN PATENT DOCUMENTS

| | | | | | |
|---|---|---|---|---|---|
| CN | 102558653 A | * | 7/2012 | ............ | B29C 48/92 |
| CN | 104277332 A | * | 1/2015 | ............ | B29C 48/92 |
| CN | 205617705 U | * | 10/2016 | | |
| CN | 106223569 A | * | 12/2016 | ................ | C08L 9/02 |
| DE | 202009008825 U1 | * | 10/2009 | ........ | E04F 15/02038 |

* cited by examiner

PANELS AND DECORATIVE PANEL

TECHNICAL FIELD

The present disclosure is directed to building materials, specifically to panels and their interlocking mechanisms.

BACKGROUND OF THE DISCLOSURE

The ceramic tile and the plank are traditional flooring or wall paneling materials. However, neither is moisture-resistant, causing problems especially when used in the bathrooms. In rainy or foggy days, there are always water drops on the surface of the ceramic tile or the plank, making them deformed and mildewed in the long run. In other words, the size of the ceramic tile or the plank may be not stable.

In the meanwhile, the wall panels on market are always designed to have differentiated connection edges in the shiplap style, with which two panels are abutted together. Such panels can be only assembled on the installation plane, and the seams among panels may become larger over time since there is no interlocking mechanisms, which makes the wall look less nice and accumulated with dust and other pollutants. When such wall panels are installed in places like hospitals, the pollutants and bacteria in the seams may bring an adverse health effect.

SUMMARY OF THE DISCLOSURE

The present disclosure aims to overcome the above shortcomings, i.e., to solve the seam problem, and to provide panels that have surface patterns (such as intersecting or parallel grooves or other patterns) or coating layers, not seen in traditional panels, and can be seamlessly jointed to avoid moisture, mildew and bacteria accumulation. Such panels can be installed efficiently, with no interruption to business.

Therefore, the present disclosure provides panels and corresponding interlocking mechanisms that are cost-efficient, simple in structure, nice in appearance and can be widely used.

According to an aspect of the present disclosure, a panel is provided that comprises a substrate, wherein the outward-facing surface of the substrate is provided with a coating layer, a patterned paper, a film or wax, wherein one joint edge of the substrate is arranged with a recess, and a groove adjacent and interconnected to the recess is arranged inside the substrate, and wherein the opposite joint edge of the substrate is provided with a protrusion that can fit into the recess, and a tongue that can fit into the groove is extended from the protrusion.

In other words, the two opposite joint edges of the substrate are respectively provided with a "tongue/protrusion" structure and a "groove/recess" structure. Two panels are connected and interlocked as the tongue/protrusion is gradually fitted into the groove/recess. In particular, one panel is presented at a certain slight angle relative to the other and then inserts its tongue/protrusion into the groove/recess of the other panel. Therefore, one panel cannot be easily disengaged from the other once interlocked. In this way, two panels can be better fixed, and will not separate over time via in-plane displacement.

In one embodiment, the recess of the panel is further provided with a locking protrusion, and the protrusion is further provided with a locking groove that can be fitted into the locking protrusion.

The substrate of the panel is a wood board, a bamboo board, a metal board, a stone composite plate, a PVC flooring, a WPC board, a LVT board, a calcium silicate board, an aluminum composite board, a plastic film, a PVC coil, a bamboo wood composite board, a magnesium oxide plate, a biological composite board, a wood composite board, a stone plate, a limestone plate, or a calcium silicone carbonate plate.

The coating layer of the panel is patterned or not.

The coating layer of the panel is flat or has three-dimensional lines.

In one embodiment, the coating layer is coated on the substrate at an amount of 5-500 g/m$^2$ (0.147-14.75 oz/yd$^2$). The coating amount can be adjusted based on actual needs.

In one embodiment, the upper or lower surface of the substrate is provided with intersecting or parallel grooves, or provided with other patterns. In one embodiment, the grooves or patterns are 0.1-8 mm (0.0039-0.315 inch) in depth, and 0.1-10 mm (0.0039-0.394 inch) in width. In one embodiment, the grooves or patterns are provided with chamfers at the edges. In one embodiment, the grooves or patterns are coated with a coating. In one embodiment, 1%-100% of the groove or pattern-covering area is coated with the coating.

In one embodiment, the substrate is made by the following materials at the following mass ratio:

| | |
|---|---|
| PVC resin or PVC powder | 100 parts; |
| Styrene elastomer | 25-45 parts; |
| Stone powder, sawdust or rock | 180-280 parts; |
| An additive | 1-10 parts; |
| Elastomer coupling agent | 1-4 parts. |

The additive is one or more selected from the group consisting of a stabilizer, stearic acid, PE wax, chlorinated polyethylene, a modifier, a dye, a brightener and a plasticizer.

The elastomer coupling agent is obtained by polymerization of a polyol, allylic acid, styrene or derivatives, and vinyl chloride.

The panel of the disclosure may be further provided with a structure enabling the panel to bend when needed, wherein such a structure is at least one groove or cut where the panel may easily bend, wherein the depth of the groove or cut is not greater than the thickness of the substrate. In one embodiment, the depth of the groove or cut is not be greater than the thickness of the panel.

In one embodiment, the elastomer coupling agent is prepared by a method comprising the steps of:

1) adding a polyol and allylic acid into a polymerization reactor in turn, reacting the resultant mixture under an acid catalyst for 0.1-0.5 hours at 80-120° C., removing water and obtaining a mixture, wherein the acid catalyst is a protonic acid such as concentrated sulfuric acid, an acid phase transfer catalyst, and the like; and 2) reacting the obtained mixture with styrene or derivatives and vinyl chloride at 120-160° C. at the presence of an initiator for 1-2 hours, raising the temperature to 200-240° C., and allowing the reaction to proceed for another 1-3 hours to obtain the elastomer coupling agent.

The initiator may be magnesium metal, DBU, a ruthenium catalyst and the like.

In one embodiment, the polyol, allylic acid, styrene or derivatives, and vinyl chloride are at a molar ratio of 1:2-6:5-15:5-15.

In one embodiment, the polyol is one or more selected from the group consisting of glycol, 1,2-propanediol, dipropylene glycol, 1,4-butanediol, 1,6-hexanediol, neopentyl glycol, triethylene glycol, diethylene glycol, trihydroxymethyl propane, pentaerythritol and glycerol.

In another aspect, the present disclosure provides a decorative panel formed by arranging and interlocking several panels of the disclosure in sequence, wherein the protrusion of a panel is fitted into the recess of a neighboring panel, and a new recess is formed on the joint.

In one embodiment, the recess on the joint is filled with a wax sealing layer or a sealing bar.

In one embodiment, the decorative panel composed of several panels of the disclosure is provided with coordinating trims at the edges, wherein the trims function to cover the edges.

Generally speaking, the trims can be I-shaped, U-shaped, L-shaped or in other shapes that can cover the panel edges. In the process of panel installation, the trims can be bonded to using an adhesive or nailed to the panel edges.

In one embodiment, the trims may be made of PVC, WPC, SPC, ceramic, metal, calcium silicate, or wood.

Further, the present disclosure provides a panel installation process comprising the steps of:

1) covering the back surface of a panel with an adhesive, wherein the adhesive may be a double sided adhesive tape or other adhesives, wherein the double sided adhesive tape may be made of plastic foam, PET, PVC film, non-woven fabric, or thin film, wherein the adhesive is added on the panel back in parallel lines in the longitudinal direction and/or widthwise direction with the same or different distances between adjacent two lines, forming a fence or a net like shape, wherein the part of the panel with the adhesive such as the double sided adhesive tape is slightly shorter than the overall panel length or width;

2) arranging and seamlessly interlocking multiple panels in the same installation plane in the longitudinal direction and/or widthwise direction, wherein multiple panels are generally arranged and seamlessly interlocked from left to right or from right to left;

3) fixing the panel connections using a nail gun at the joint recess; and 4) covering the edges of panels that will not connect to further panels with trims using an adhesive.

In one embodiment, a first panel and a second panel perpendicular to the first one are connected and fixed with a trim using an adhesive at a right angle corner during panel installation.

In one embodiment, a panel is bent at a right angle corner during panel installation, and then interlocked with another panel in the new installation plane.

In one embodiment, a corner clip is used at a right angle corner during panel installation, wherein the corner clip is composed of an arc or right angle shaped angle plate and two side plates, one of the two side plates are perpendicular to the other, the two side plates are connected respectively to two ends of the angle plate, two further plates are respectively arranged on the side plates, each in parallel to one side plate and perpendicular to the other, wherein the panels to the installed at the corner are respectively attached to the two side plates and arranged against the two further plates.

The Usage and Effect of the Disclosure

The panels of the disclosure can be seamlessly interlocked, and the recess formed on the joint between two adjacent panels is filled with a sealing wax or a sealing bar, avoiding moisture, mildew and bacteria accumulation at the joint. In the meanwhile, different substrates can be selected for the panels of the disclosure in consideration of the cost. The panels can be cut into different sizes and/or shapes as needed, decorated to have ceramic tile or wood board's appearance, and/or covered with different functional coatings. The present disclosure aims to provide panels and corresponding interlocking mechanisms that are cost-efficient, simple in structure, nice in appearance and can be widely used. The panels can be installed efficiently, without interrupting business.

The present disclosure also provides bendable panels, or alternatively a mechanism that enables panel installation at corners. In this way, the panels can be seamlessly connected, which is favored by hospitals where cleanliness is important.

Further, in order to avoid surface crack caused by bending, the panels of the disclosure use a special substrate layer where components such as the elastomer are added. Such components improve the elastic bending property and stress absorption of the panels. When the panels are bent at a certain angle with external force, the bending tension can be absorbed by the substrate components, resulting in natural bending, which improves surface appearance and also internal bending toughness and bending strength. When the panels are provided with grooves or cuts to help them bend, the strength of the panels can be maintained Unlike the traditional wood and other plates, cracks may occur when being cut. At the same time, the inventors found during the study that if the traditional formulation is modified by adding only the elastomer, the elastomer is immiscible with the rest components due to the property differences. As a result, the extrusion molding of the panels will be badly affected, i.e., on one hand, it is hard to perform the extrusion molding, on the other hand, the formed panels are easy to deform. In order to solve the problem, an elastomer coupling agent is introduced into the formulation to solve the problem. With the addition of the elastomer coupling agent, the elastomers is miscible with and well mixed with PVC, stone/wood and other components, which improves the bonding and functionality of the above components, so that the extrusion molding products can reach the target level.

BRIEF DESCRIPTION OF THE DRAWINGS

The reference numerals in FIG. 1 and FIG. 2 are: 1—substrate; 2—locking protrusion; 3—recess; 4—groove; 5—locking groove; 6—tongue; 7—protrusion; 8—coating layer; 9—sealing bar; 10—first panel; 20—second panel.

DETAILED DESCRIPTION OF THE DISCLOSURE

Figure 1:
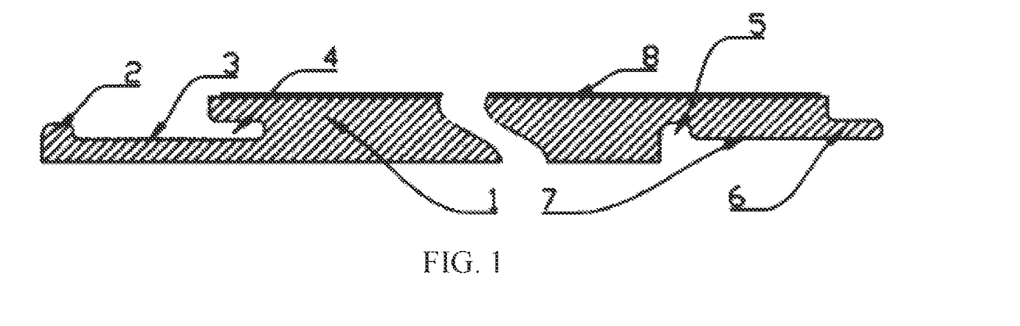
FIG. 1 is a schematic diagram showing the structure of a panel in an embodiment.

As shown in FIG. 1, the present embodiment provides a panel comprising a substrate 1, wherein the outer/upper surface of the substrate 1 is provided with a coating layer 8, a moisture-proof and flame-retardant patterned paper, a film, or PE wax, to improve the appearance and durability of the substrate. One can choose different coating layers according to actual needs to achieve different effects.

The substrate 1 is a plank-like panel, and comprises, in the installation direction, two joint edges respectively provided with mechanisms that can be engaged to interlock two adjacent panels.

The substrate 1 is a wood board, a bamboo board, a metal board, a stone composite plate, a PVC board, a WPC board, a LVT board, a calcium silicate board, an aluminum composite board, a plastic film, a PVC coil, a bamboo wood composite board, a glass magnesium oxide plate, a biological composite board, a wood composite board, a stone plate, a limestone plate, or a calcium silicon carbonate plate. The metal board includes a steel plate, an aluminum plate, an alloy plate and other metal plates. The SPC board is a kind of stone composite board, including the LVT board (stone composite flooring). If the surface of substrate 1 is not to be further processed, then the SPC plate is preferred. The WPC board is a kind of wood composite board, which is prepared by uniformly mixing wood and thermoplastic materials and then molding the resultant mixture, and thus has the characteristics of both wood and plastics, making the board look nice. The PVC board is a plate made of PVC with an inner honeycomb-like structure, and has good chemical stability, corrosion resistance, high hardness, high strength, UV resistance (aging resistance), fire resistance (with self-extinguishing property), reliable insulation, neat smooth surface, no water absorption, and no deformation, and is easy to be processed, which improves the practicability. The aluminum composite plate is a three-layered composite plate with plastic as the core layer and aluminum as two surface layers, and is covered with decorative and protective coating or film on plate surfaces. The substrate 1 can be made of different materials according to actual needs in consideration of cost issue.

The left (or right) side of the substrate 1 is arranged with a recess 3 and a groove 4 to the inner side of the recess 3. The distal end of the recess 3 is provided with a locking protrusion 2. The structures are designed to restrict the movement of the mechanism fitted into the recess. The recess 3 is generally arranged on the upper surface (or the lower surface) of the substrate 1.

The right (or left) side of the substrate 1 is provided with a coordinating protrusion 7 that can be fitted into the recess 3. A tongue 6 is provided at the distal end of the protrusion which coordinates and fits into the groove 4. The protrusion 7 is further provided with a locking groove 5 that coordinates and fits into the locking protrusion 2. With such structure design, the up-down and left-to-right movements of two adjacent interlocked panels can be better restricted. The protrusion 7 is generally arranged on the lower surface (or upper surface) of the substrate 1.

The mechanisms on the left and right sides of the substrate 1 may seamlessly interlock two panels and restrict their mutual movements so as to improve the performance in use.

The present embodiment also provides the application of the above panels.

Figure 2:
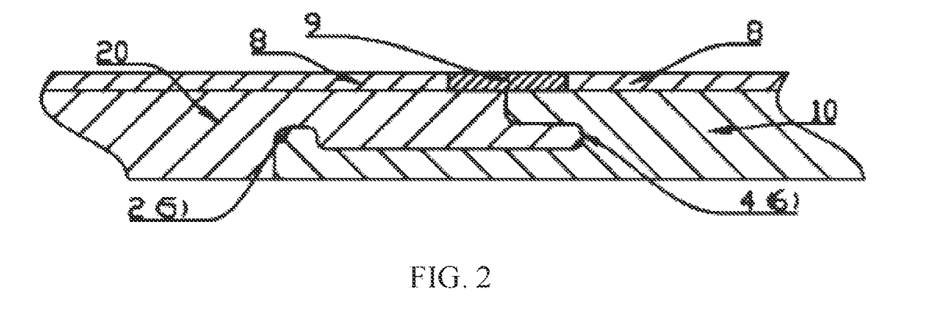
FIG. 2 is a schematic diagram showing the panels when installed together in an embodiment.

A large decorative panel can be obtained by arranging and interlocking several panels of the disclosure. As shown in FIG. 2, the decorative panel is obtained by arranging and interlocking several panels of the disclosure in sequence. Two panels (i.e., a first panel 10 and a second panel 20) are taken as an example to illustrate the panel installation. The protrusion 7 of the second panel 20 is fitted into the recess 3 of the first panel 10, and a recess is formed on the joint. These panels look like tiles or wood panels such that people will be satisfied with the overall appearance.

When the above two panels are interlocked in the "tongue/protrusion-and-groove/recess" manner, the recess at the joint is filled with a sealing wax or a sealing bar 9, so that the installed panels are moisture-proof and have not bacteria accumulated. Such panels can be installed in hospitals.

The present disclosure also discloses processes for installing the panels as wall panels or flooring panels, as shown in FIGS. 3 to 6. The processes are as follows.

Figure 3:
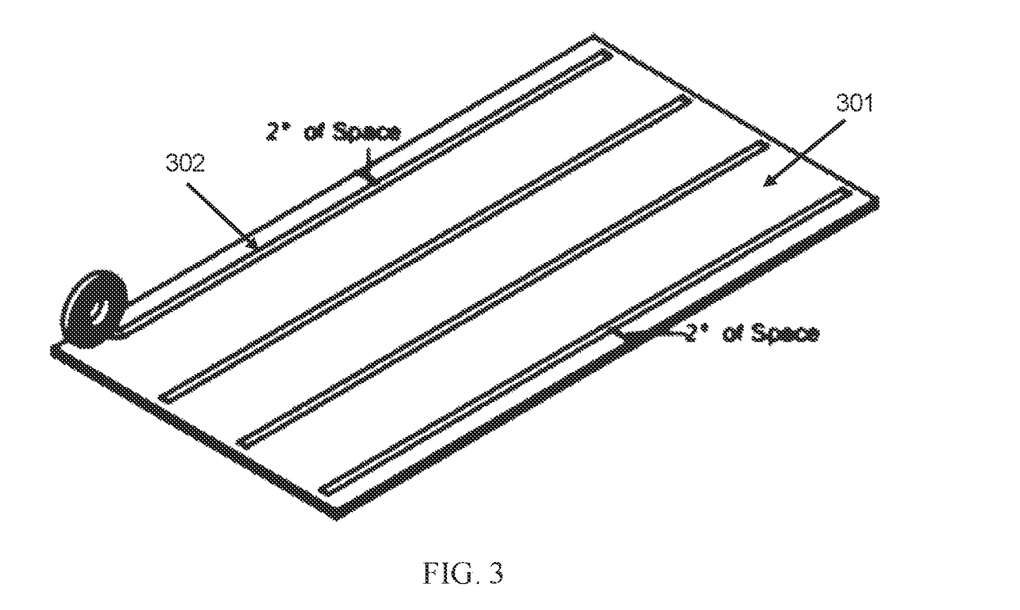
FIG. 3 is a schematic diagram showing the panel installation process in an embodiment.
Figure 4:
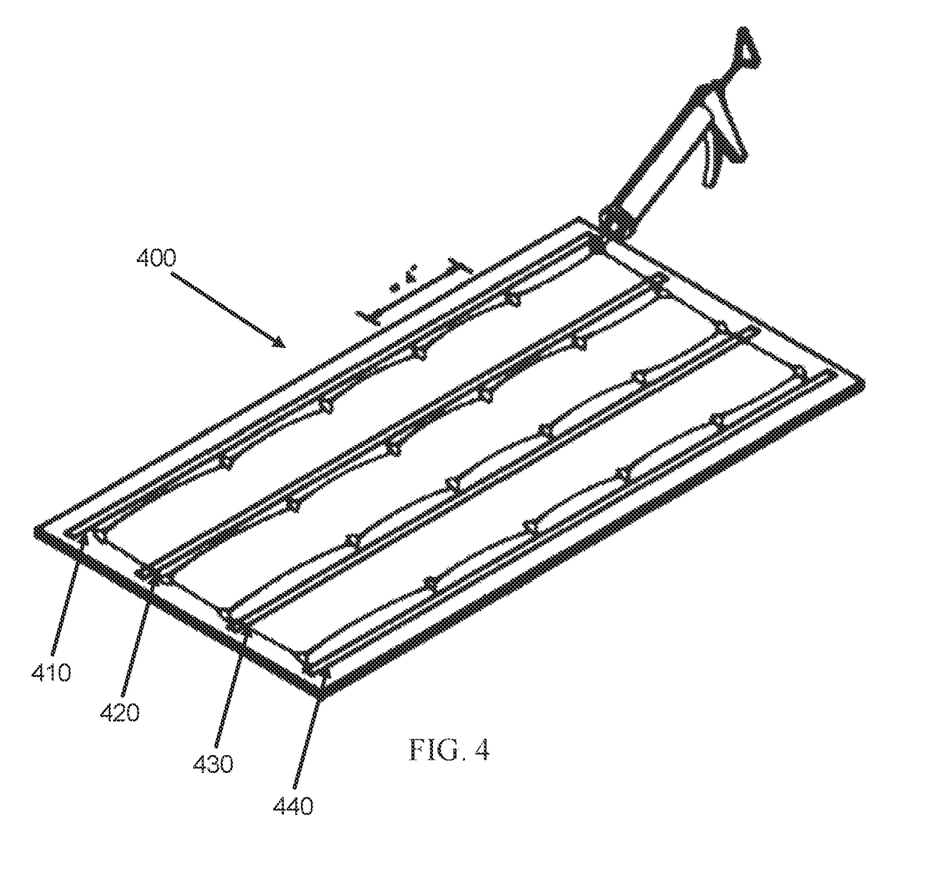
FIG. 4 is a schematic diagram showing the panel installation process in an embodiment.

As a first step, as shown in FIGS. 3 and 4, the panel back 301 is covered with the double sided adhesive tape 302 and coated with some other adhesives. The double sided adhesive tape is made of plastic foam, PET, PVC film, nonwoven fabric, or thin film, and covers the panel back in parallel lines in the longitudinal direction and/or widthwise direction with the same or different distances between adjacent two lines, wherein the part of the panel covered by the double sided adhesive tape is slightly shorter than the panel length or width.

In the present embodiment, one panel 400 is covered on the back with 4 pieces of double sided adhesive tapes 410, 420, 430, 440 in the longitudinal direction, coated with silica gel around the adhesive tapes every 4 to 40 cm (1.57 to 15.75 inches), and then attached to the wall on the most left.

Figure 5:
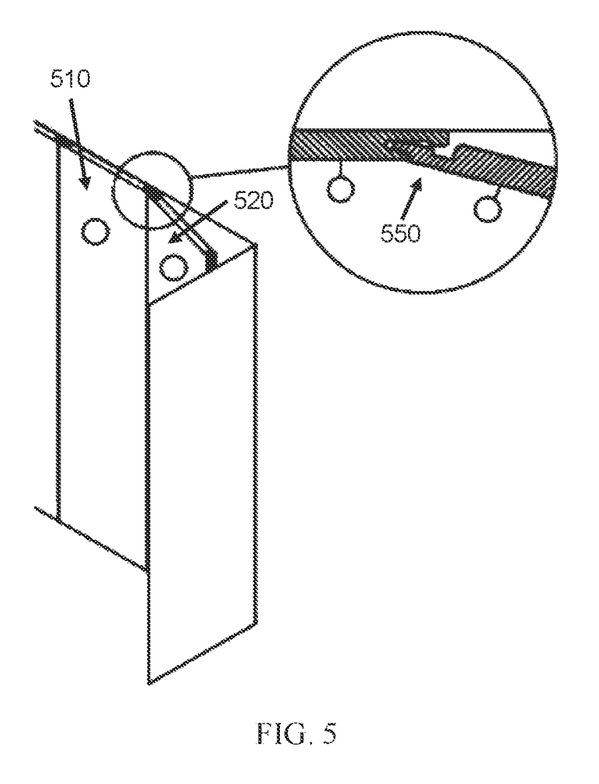
FIG. 5 is a schematic diagram showing the panel installation process in an embodiment.

As the second step, as shown in FIG. 5, several panels 510, 520 are arranged and seamlessly interlocked on the same plane in a certain direction, with recesses formed on the joints.

As the third step, as shown in FIG. 5, the connection of adjacent two panels 510, 520 are further fixed at the joint 550 using a nail gun.

Figure 6:
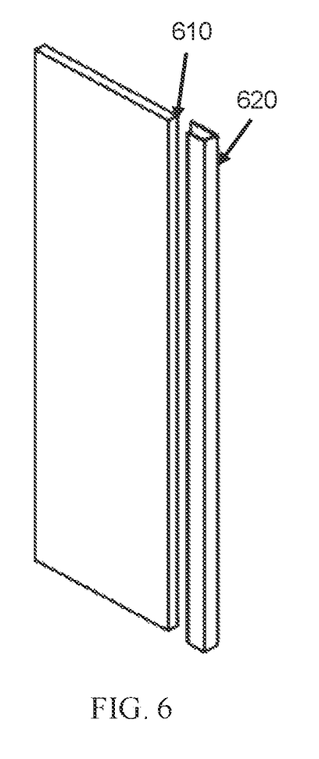
FIG. 6 is a schematic diagram showing the panel installation process in an embodiment.

As the fourth step, as shown in FIG. 6, a panel edge 610 with no panel connection is covered with a trim 620 using an adhesive.

There are several ways to install panels at wall corners.

Figure 7:
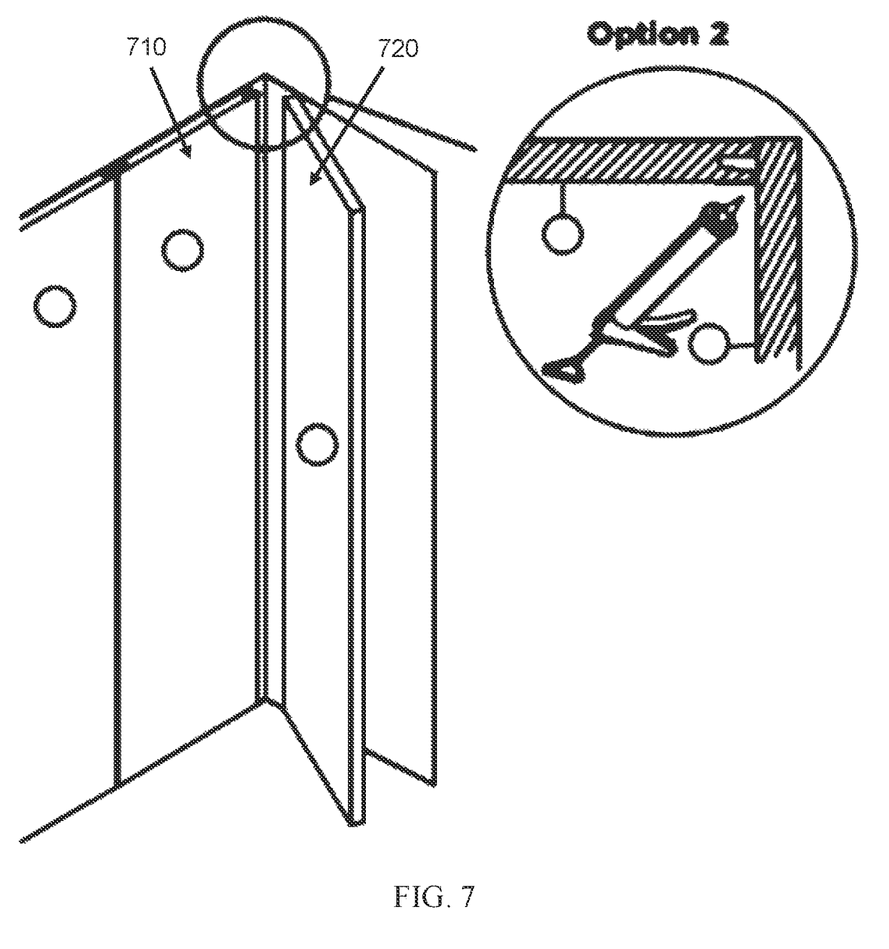
FIG. 7 is a schematic diagram showing the panel installation process in an embodiment.

The first way to install panels at a wall corner is to connect and fix a first panel 710 and a second panel 720 perpendicular to the first panel 710 using a trim with an adhesive, as shown in FIG. 7.

Figure 8:
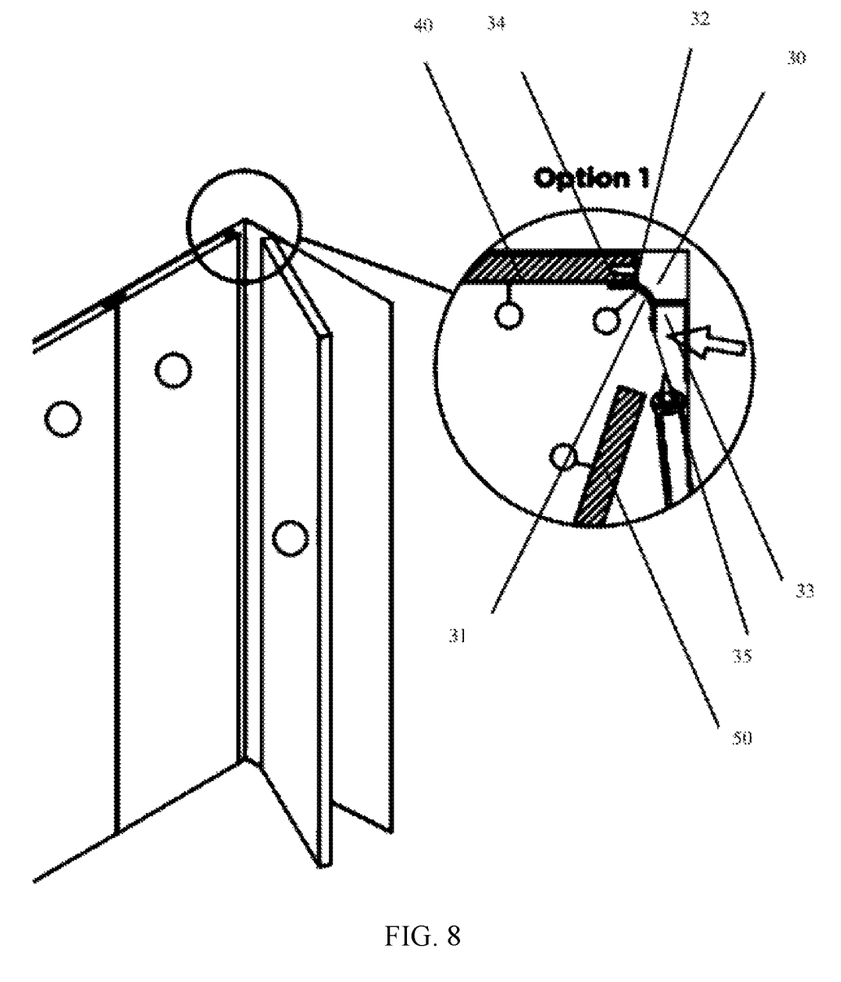
FIG. 8 is a schematic diagram showing the panel installation process in an embodiment.

The second way is shown in FIG. 8. In particular, a corner clip 30 is arranged at a right angle corner using a nail gun. The corner clip 30 is composed of an arc shaped angle plate 31, a first side plate 32 and a second side plate 33 perpendicular to the first side plate 32. The two side plates are connected respectively to two ends of the angle plate, and two further plates 34 and 35 are respectively arranged on the side plates, each in parallel to one side plate and perpendicular to the other. The panel 40 and panel 50 to be installed at the corner are bonded with the side plate 32 and the side plate 33, respectively.

The third way to deal with the panel installation at a wall corner is to cut a groove at the back of a certain panel, bend the panel with a 90° angle, and bond the panel at the corner. Next, a panel is arranged and interlocked with the bent panel.

Effects of the Present Embodiment

In the present embodiment, the panels of the disclosure are seamlessly interlocked by fitting the protrusion and the tongue respectively into the recess and the groove, wherein the joint seams are not visible at the distance of 1.5 m (59.06 inches). The recess formed on the joint is filled with a sealing wax or a sealing bar, so that the installed panels are moisture-proof and have not bacteria accumulated. The outer/upper surface of the substrate is provided with a coating layer to provide protective and/or decorative effects. Further, one may choose a substrate taking cost into consideration. In this respect, one can save cost but still use nice looking panels that are visually similar to ceramic tiles or wood boards.

Embodiments with Modifications Based on the Above Embodiment

Modified Embodiment 1

The coating layer 8 is patterned to provide nice appearance. Also, the coating layer 8 may be colored to further improve the appearance.

Modified Embodiment 2

The outer surface of the substrate 1 is provided with intersecting grooves or other patterns to improve the appearance and at the same time to allow water drops slide down. In this respect, the practicability is improved.

Modified Embodiment 3

The grooves or other patterns in Modified Embodiment 2 are covered with a coating, so as to provide a longer service life.

Modified Embodiment 4

The surface of the decorative panel is covered with a coating to prolong the service life.

Modified Embodiment 5

The substrate 1 is prepared by mixing the following materials at specified mass ratios and subjecting the mixture to extrusion molding.

| | |
|---|---|
| PVC resin | 100 parts; |
| TPEE | 25 parts; |
| Stone powder | 130 parts; |
| Perlite | 30 parts; |
| A stabilizer | 1.5 parts; |
| Stearic acid | 0.8 part; |
| PE wax | 0.2 part; |
| ACR modifier | 2 parts; |
| Titanium dioxide | 1 part; |
| A brightener | 0.01 part; |
| Elastomer coupling agent 5# | 2.5 parts. |

The elastomer coupling agent 5 #is prepared by adding 1 eq glycol and 2 eq allylic acid into a polymerization reactor in turn, reacting the resultant mixture at the presence of an acid phase transfer catalyst for 0.5 hour at 120° C., raising the temperature to 160° C., adding to the reactor 5 eq styrene, 5 eq vinyl chloride and an alkali, reacting the obtained mixture for 1 hour, raising the temperature to 240° C., and allowing the reaction to proceed for 1.5 hours.

Such a substrate is a particularly suitable substrate to be used in a panel installed at a corner. In panel installation, the panel is cut at a proper position, bent at a certain angle, and attached and fixed at the corner using an adhesive and a nail gun. Then, panel installation proceeds in the new installation plane.

Modified Embodiment 6

The substrate 1 is prepared by mixing the following materials at specified mass ratios and subjecting the mixture to extrusion molding, and 0.5 mm (0.02 inch) thick.

| | |
|---|---|
| PVC resin | 100 parts; |
| TPE | 45 parts; |
| Sawdust | 280 parts; |
| A stabilizer | 1.5 parts; |
| Stearic acid | 1.5 parts; |
| PE wax | 1 part; |
| Chlorinated polyethylene | 1.5 parts; |
| ACR modifier | 3 parts; |
| An antioxidant | 0.5 part; |
| A dye | 1 part; |
| Elastomer coupling agent 6# | 2 parts. |

The elastomer coupling agent 6 #is prepared by adding 1 eq glycol and 2 eq allylic acid into a polymerization reactor in turn, reacting the resultant mixture at the presence of concentrated sulfuric acid for 0.2 hour at 100° C., raising the temperature to 120° C., adding to the reactor 10 eq styrene, 15 eq vinyl chloride and an initiator, reacting the obtained mixture for 1 hour, raising the temperature to 200° C., and allowing the reaction to proceed for 3 hours.

Such a substrate is a particularly suitable substrate to be used in a panel installed at a corner. In panel installation, the panel is cut at a proper position, bent at a certain angle, and attached and fixed at the corner using an adhesive and a nail gun. Then, panel installation proceeds in the new installation plane.

Modified Embodiment 7

The substrate 1 is prepared by mixing the following materials at specified mass ratios and subjecting the mixture to extrusion molding, and 0.3 mm (0.012 inch) thick.

| | |
|---|---|
| PVC powder | 100 parts; |
| Polystyrene elastomer | 35 parts; |
| Sawdust | 200 parts; |
| Perlite | 20 parts; |
| A stabilizer | 1 part; |
| Stearic acid | 0.3 part; |
| PE wax | 1 part; |
| Elastomer coupling agent 7# | 0.5 part. |

The elastomer coupling agent 7 #is prepared by adding 1 eq triethylene glycol and 2.5 eq allylic acid into a polymerization reactor in turn, reacting the resultant mixture at the presence of concentrated sulfuric acid for 0.2 hour at 100° C., raising the temperature to 160° C., adding to the reactor 15 eq styrene, 5 eq vinyl chloride and an initiator, reacting the obtained mixture for 1 hour, raising the temperature to 240° C., and allowing the reaction to proceed for 1.2 hours.

Such a substrate is a particularly suitable substrate to be used in a panel installed at a corner. In panel installation, the panel is cut at a proper position, bent at a certain angle, and attached and fixed at the corner using an adhesive and a nail gun. Then, panel installation proceeds in the new installation plane.

The invention claimed is:
1. A panel comprising:
a substrate (1), wherein:
an outer surface of the substrate (1) is covered with a coating layer, a patterned paper, a film or wax (8);

a first edge of the substrate is provided with a recess (3) and a groove (4) inside the substrate (1);
the groove (4) is adjacent and interconnected to the recess (3);
a second edge of the substrate (1) is provided with a protrusion (7) and a tongue (6) extending from the protrusion (7);
the second edge is opposite to the first edge;
the protrusion (7) is configured to be fitted into the recess (3);
the tongue (6) is configured to be fitted into the groove (4); and
the substrate (1) is composed of materials at mass ratios as follows:

| | |
|---|---|
| PVC resin or PVC powder | 100 parts, |
| styrene elastomer | 25-45 parts, |
| stone powder, sawdust or rock | 180-280 parts, |
| an additive | 1-10 parts, and |
| an elastomer coupling agent | 1-4 parts; | the additive is one or more selected from the group consisting of a stabilizer, stearic acid, PE wax, chlorinated polyethylene, a modifier, a dye, a brightener and a plasticizer, and
the elastomer coupling agent is obtained by polymerization of a polyol, allylic acid, styrene or derivatives, and vinyl chloride.

2. The panel according to claim 1, wherein:
a locking groove (5) is provided on the protrusion (7); and
a locking protrusion (2) is provided on the recess (3) and is configured to be fitted into the locking groove (5).

3. The panel according to claim 1, wherein the substrate (1) is a wood board, a bamboo board, a metal board, a stone composite plate, a WPC board, a PVC board, a LVT board, a calcium silicate board, an aluminum composite board, a plastic film, a PVC coil, a bamboo wood composite board, a magnesium oxide board, a biological composite board, a wood composite board, a stone plate, a limestone plate, or a calcium silicone carbonate plate.

4. The panel according to claim 1, wherein the coating layer (8) is patterned or provided with three-dimensional lines, and coated on the substrate (1) at an amount of 5-500 g/m$^2$ (0.147-14.75 oz/yd$^2$).

5. The panel according to claim 1, further comprising a structure enabling the panel to bend,
wherein the structure is at least one groove or cut where the panel is easily bent,
wherein a depth of the groove or cut is not greater than a thickness of the substrate.

6. The panel according to claim 1, wherein an upper or lower surface of the substrate (1) is provided with intersecting or parallel grooves, or other patterns.

7. The panel according to claim 6, wherein the intersecting or parallel grooves, or other patterns are 0.1-8 mm (0.0039-0.315 inch) in depth and 0.1-10 mm (0.0039-0.394 inch) in width, and coated with a coating.

8. The panel according to claim 7, wherein 1%-100% of an area with the intersecting or parallel groove or other patterns is covered with the coating.

9. The panel according to claim 1, wherein the elastomer coupling agent is prepared by a method comprising the steps of:
1) adding a polyol and allylic acid into a polymerization reactor in turn, reacting the resultant mixture under an acid catalyst for 0.1-0.5 hours at 80-120° C., removing water and obtaining a mixture; and
2) reacting the obtained mixture with styrene or derivatives and vinyl chloride at 120-160° C. at the presence of an initiator for 1-2 hours, raising the temperature to 200-240° C., and allowing the reaction to proceed for another 1-3 hours to obtain the elastomer coupling agent.

10. The panel according to claim 9, wherein the polyol, allylic acid, styrene or derivatives, and vinyl chloride are at a molar ratio of 1:2-6:5-15:5-15.

11. The panel according to claim 9, wherein the polyol is one or more selected from the group consisting of glycol, 1,2-propanediol, dipropylene glycol, 1,4-butanediol, 1,6-hexanediol, neopentyl glycol, triethylene glycol, diethylene glycol, trihydroxymethyl propane, pentaerythritol and glycerol.

12. A decorative panel formed by arranging and interlocking multiple panels according to claim 1, wherein the protrusion (7) of a first panel of the multiple panels is fitted into the recess (3) of a second panel of the multiple panels, and a new recess (9) is formed on a resulting joint.

13. The decorative panel according to claim 12, wherein the recess (9) on the joint is filled with a wax sealing layer or a sealing bar.

14. The decorative panel according to claim 12, further provided with coordinating trims at the edges to cover the edges.

15. The decorative panel according to claim 14, wherein the trims are made of PVC, WPC, SPC, ceramic, metal, calcium silicate, or wood.

16. A panel installation process comprising the steps of:
providing a plurality of panels according to claim 1;
covering the panels at a back with an adhesive;
arranging and seamlessly interlocking the panels in at least one of a longitudinal direction or widthwise direction;
fixing panel connections using a nail gun at a joint recess; and
covering the edges of panels with no further panel connection using trims with a trim adhesive.

17. The panel installation process according to claim 16, wherein a first panel of the plurality of panels and a second panel of the plurality of panels perpendicular to the first one are connected and fixed with the trim using the trim adhesive at a right angle corner during panel installation.

18. The panel installation process according to claim 16, wherein a respective panel of the plurality of panels is bent at a right angle corner during panel installation and then interlocked with another panel of the plurality of panels in a new installation plane.

19. The panel installation process according to claim 16, wherein a corner clip (30) is used at a right angle corner during panel installation, wherein the corner clip is composed of an arc or right angle shaped angle plate (31) and two side plates (32, 33), one of the two side plates is perpendicular to the other, the two side plates are connected respectively to two ends of the angle plate (31), two further plates (34, 35) are respectively arranged on the side plates, each in parallel to one side plate and perpendicular to the other, wherein the panels installed at the corner are respectively attached to the two side plates (32, 33) and arranged against the two further plates (34, 35).

* * * * *